Oct. 29, 1935.  W. S. WATT  2,018,936
EYELETING MACHINE
Filed Feb. 21, 1934  4 Sheets-Sheet 1
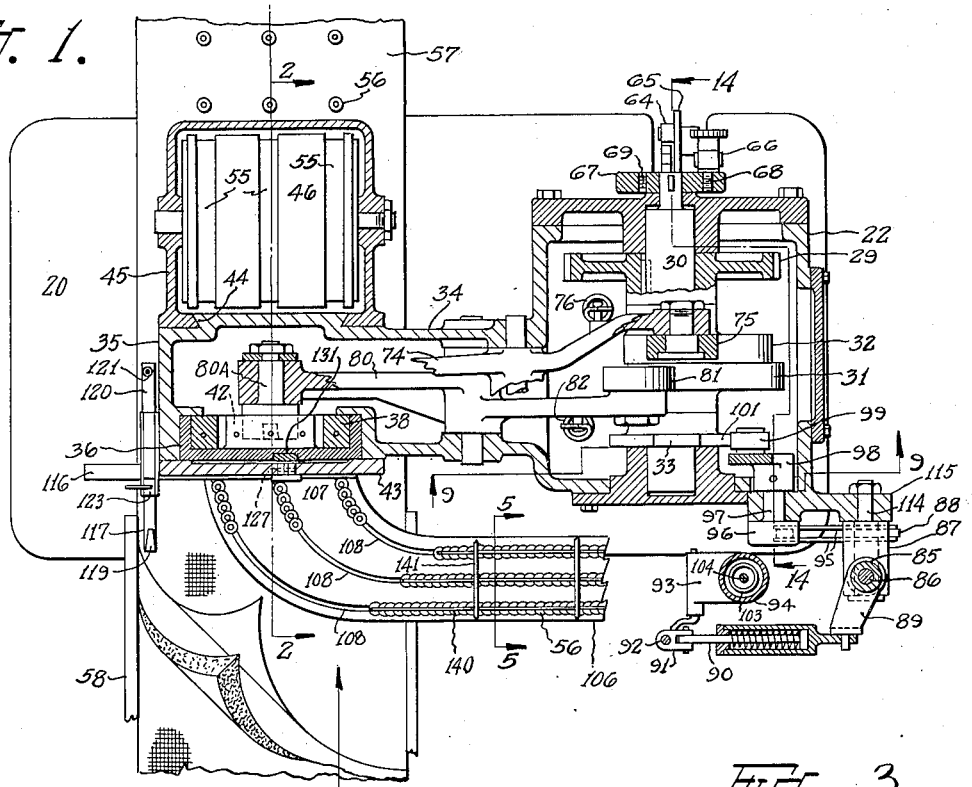
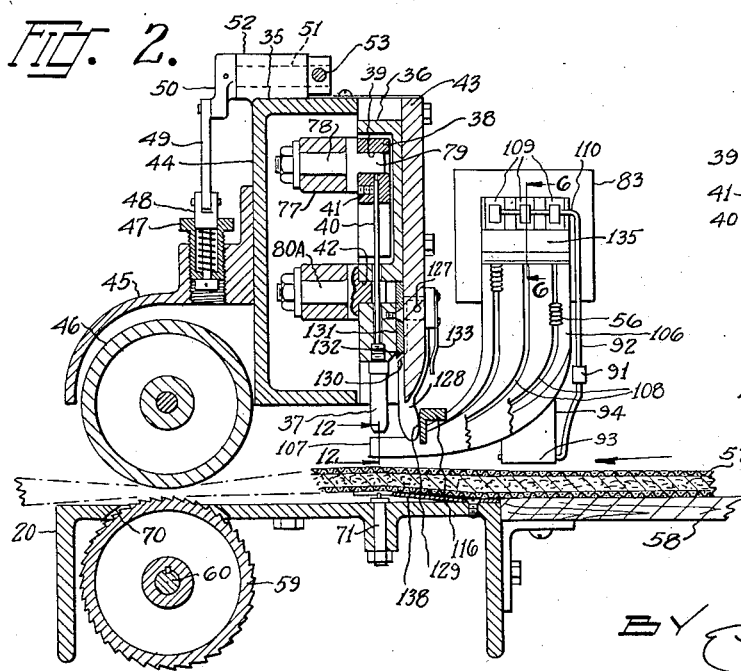
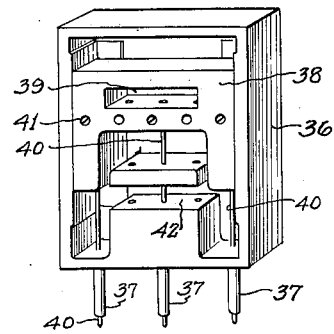
INVENTOR
W. S. WATT
ATTORNEY Oct. 29, 1935.    W. S. WATT    2,018,936
EYELETING MACHINE
Filed Feb. 21, 1934    4 Sheets-Sheet 2
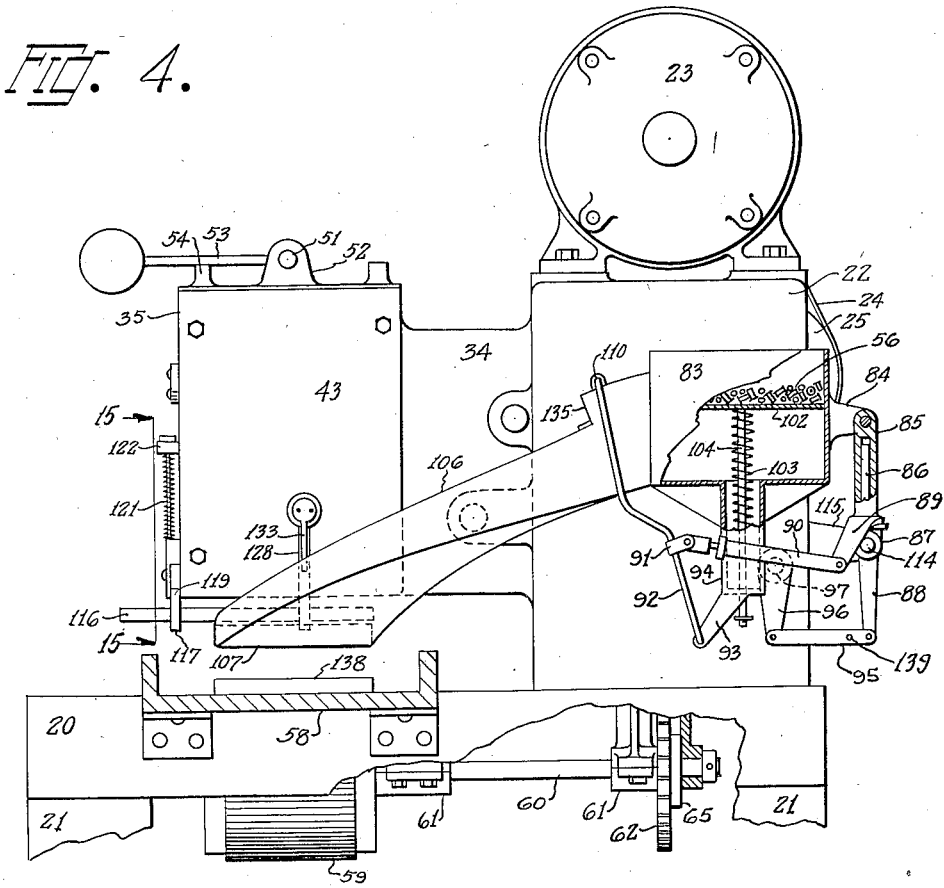
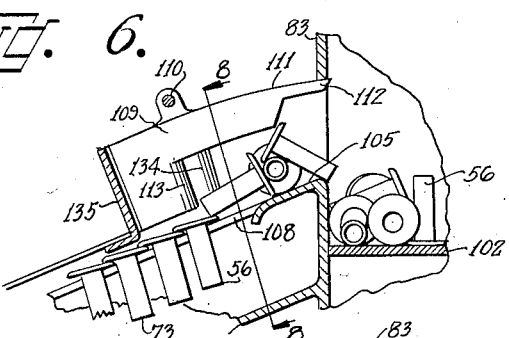
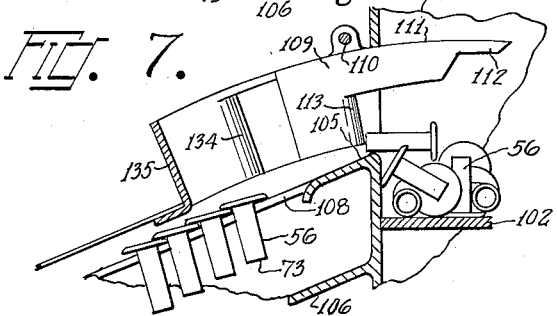
INVENTOR
W.S.WATT
ATTORNEY Oct. 29, 1935. W. S. WATT 2,018,936
EYELETING MACHINE
Filed Feb. 21, 1934  4 Sheets-Sheet 3
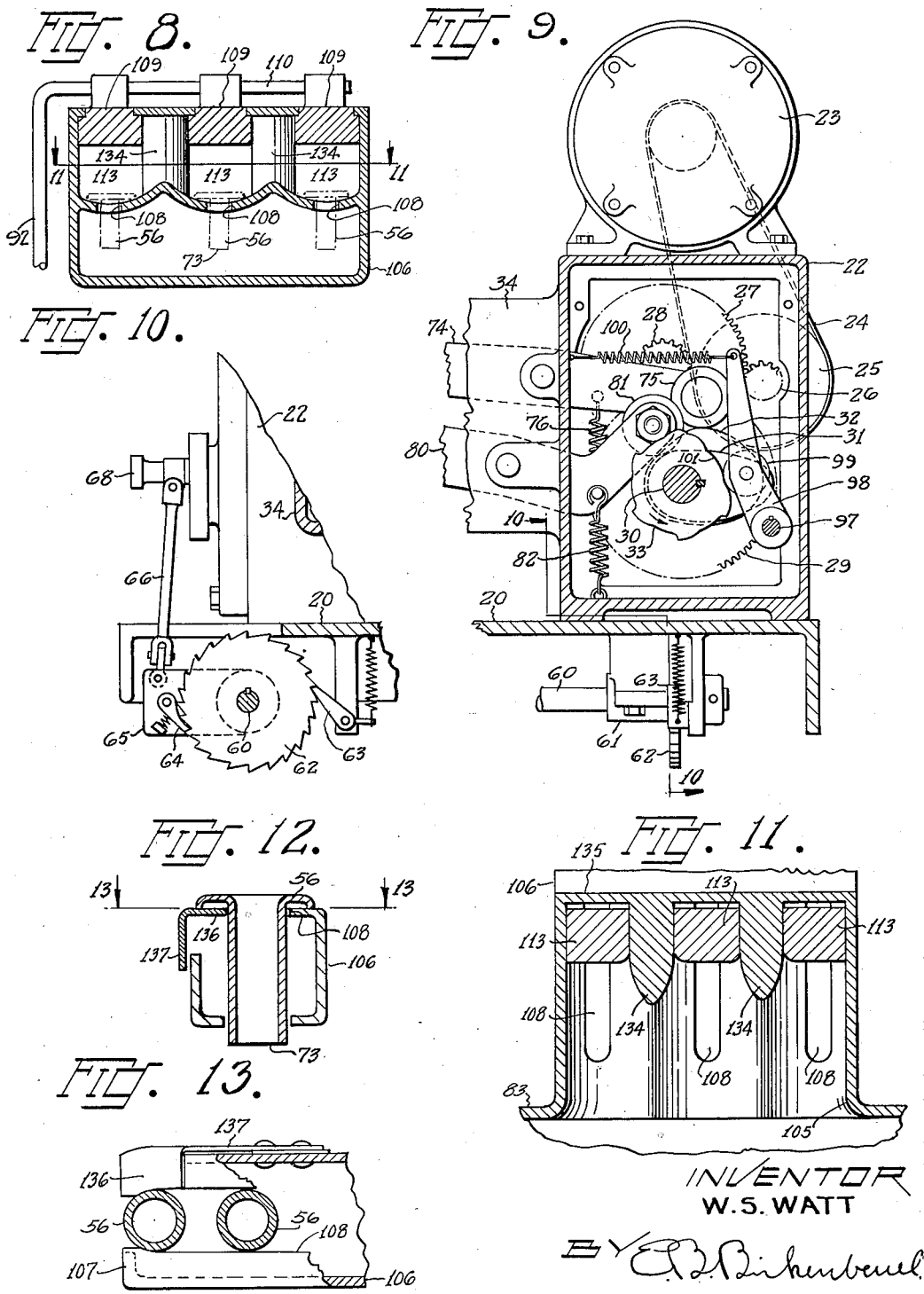

Oct. 29, 1935.  W. S. WATT  2,018,936
EYELETING MACHINE
Filed Feb. 21, 1934  4 Sheets-Sheet 4
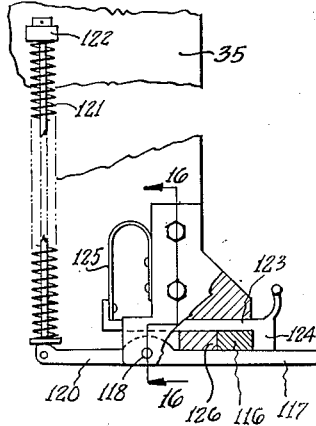
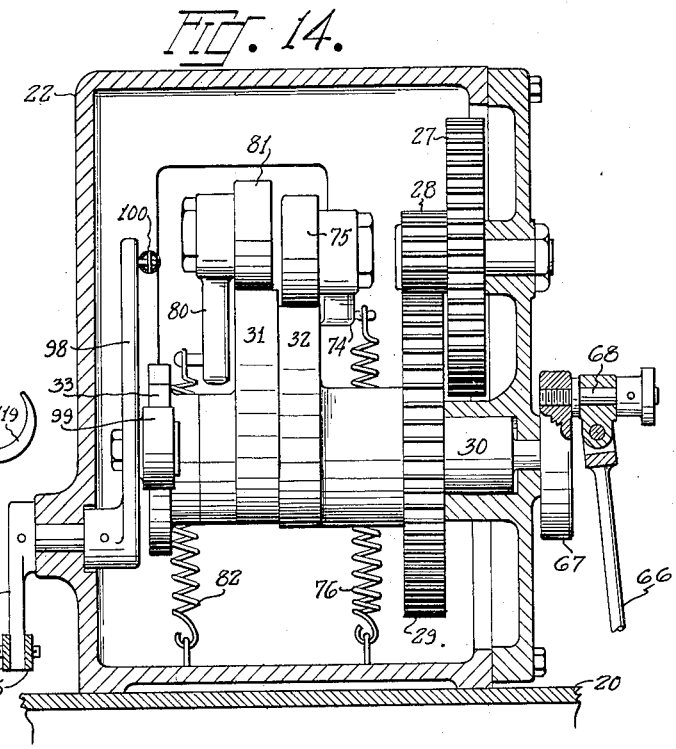
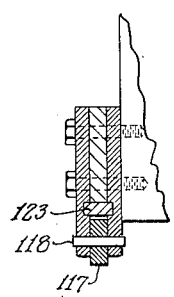
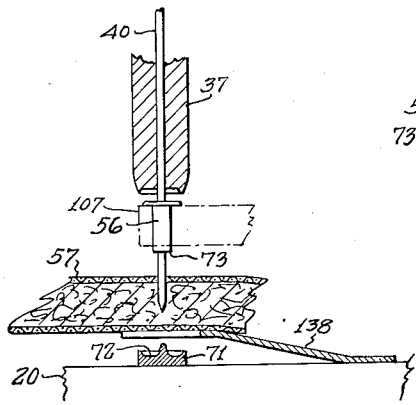
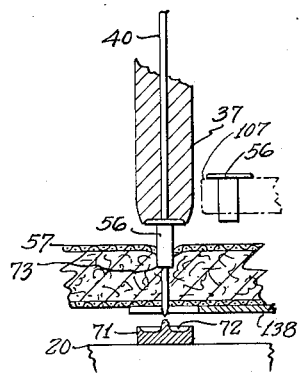
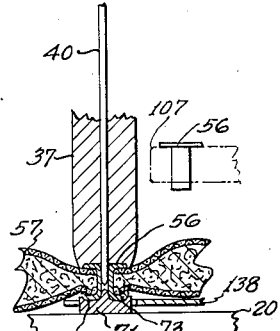
INVENTOR
W. S. WATT
BY
ATTORNEY Patented Oct. 29, 1935

2,018,936

UNITED STATES PATENT OFFICE 2,018,936

EYELETING MACHINE

William S. Watt, Portland, Oreg.

Application February 21, 1934, Serial No. 712,345

5 Claims. (Cl. 218—15.1)

This invention relates generally to the mattress making industry, and particularly to a machine for inserting eyelets in mattress borders.

The main object of this invention is the provision of an efficient form of eyeleting machine by means of which a plurality of rows of eyelets may be inserted through several layers of materials for the purpose of uniting same, and at the same time providing ventilation for the mattress.

The second object is to provide an improved form of eyelet feeding device which will insure a constant and uniform flow of eyelets to the inserting mechanism.

These, and other objects, will become more apparent from the specification following as illustrated in the accompanying drawings, in which:

Fig. 1 is a plan of the device with parts broken away in section to disclose the mechanism.

Fig. 2 is a vertical section along the line 2—2 in Fig. 1.

Fig. 3 is a perspective view of the needle and punch slide.

Fig. 4 is a side elevation of the device with parts broken away in section.

Fig. 5 is a section taken along the line 5—5 in Fig. 1.

Fig. 6 is a section taken along the line 6—6 in Fig. 2 showing the outer position of the rattler.

Fig. 7 is a view similar to Fig. 6 showing the inner position of the rattler.

Fig. 8 is a section taken along the line 8—8 in Fig. 6.

Fig. 9 is a section taken along the line 9—9 in Fig. 1.

Fig. 10 is a section taken along the line 10—10 in Fig. 9.

Fig. 11 is a section taken along the line 11—11 in Fig. 8.

Fig. 12 is a section taken along the line 12—12 in Fig. 2.

Fig. 13 is a section taken along the line 13—13 in Fig. 12.

Fig. 14 is a partial section taken along the line 14—14 in Fig. 1 showing the cams in their uppermost position.

Fig. 15 is a section taken along the line 15—15 in Fig. 4.

Fig. 16 is a section taken along the line 16—16 in Fig. 15.

Fig. 17 is a fragmentary section showing the needle entering the fabric.

Fig. 18 is a view similar to Fig. 17 but showing the ferrule entering the first layer of fabric.

Fig. 19 is a view similar to Fig. 18 but showing the ferrule passed through the fabric and riveted on the under side thereof.

Similar numbers of reference refer to similar parts throughout the several views.

Referring in detail to the drawings, there is shown a table 20 which is held at a convenient height by means of the legs 21. Mounted on the table 20 is a housing 22 upon which is secured the operating motor 23. The motor 23, through the belt 24, drives the pulley 25 which, through the pinion 26, drives the idler gear 27 to which is attached the pinion 28 which, in turn, drives the cam drive gear 29 which is keyed to the cam shaft 30.

Mounted on the cam shaft 30 is a punch cam 31 and a needle cam 32, as well as a hopper shaking cam 33. The housing 22 is provided with a lateral extension 34 which terminates in a head 35 in which is mounted the punch slide 36 from whose lower end project the tubular punches 37, three of which are illustrated, but holes are provided for two punches equi-distant from the center line of the slide to adapt the device for inserting a double row of eyelets instead of a triple row, as is shown throughout the drawings.

Slidably mounted in the slide 36 is the needle holder 38 which is provided with a horizontal recess 39. Needles 40 are held in the holder 38 by means of the set screws 41. The holder 38 is also drilled for use with two needles, as suggested, for the punches.

In the lower portion of the slide 36 is formed a slot 42. The slide 36 is held in position by means of a cover plate 43.

On the back of the head 35 is formed a dove tailed guide 44 on which is mounted the vertical movable housing 45 in which journals the upper feed roll 46. In the top of the housing 45 is threaded a hollow bushing 47 in which is mounted a spring loaded plunger 48 which is attached by means of a link 49 to the crank arm 50 on the shaft 51 which journals in the bearing 52 disposed on top of the head 35. A weighted arm 53 on the shaft 41 urges the plunger 48 downwardly. A stop 54 limits the downward movement of the roll 46. The roll 46 is preferably provided with grooves 55 which are in alignment with the eyelets 56 which are inserted in the border strip 57 which passes over the table 20 from the extension table 58.

A lower feed roll 59, preferably fluted, is mounted on the shaft 60 which journals in the bearings 61 on the under side of the table 20. The shaft 60 has secured thereon a ratchet wheel 62 which is prevented from turning in a backward direction by means of the holding pawl 63 and is driven in a feed direction by means of the pawl 64 on the rocker arm 65 which pivots on the shaft 60.

A rocking motion is imparted to the arm 65 by means of a link 66 whose upper end is connected to the crank disk 67 by means of the stud 68. The disk 67 is keyed to the shaft 30 and is provided with a pair of holes 69 of unequal distance from the center of rotation of the disk 67, the purpose of which is to provide a variation in the length of the feeding stroke for the border strip 57.

Owing to the fact that the ratchet wheel 62 and the crank 67 rotate in different planes it is desirable to provide universal connections at the upper and lower ends of the links 66.

The roll 59 is directly below the roll 46 and its top side extends through a slot 70 in the table 20.

Directly below the punches 37 and in alignment therewith are the dies 71 whose upper surface 72 is shaped to spread the lower end 73 of the eyelet 56 when the eyelet is forcibly moved downwardly upon the die 71 by means of the punch 37.

Pivotally mounted in the extension 34 is a needle cam arm 74 whose roller 75 is urged against the cam 32 by means of the spring 76. The end 77 of the needle cam arm 74 is provided with a bolt 78 having a T head 79 which is horizontally slidable within the recess 39.

Also pivotally mounted in the extension 34 is the punch cam arm 80 whose roller 81 is urged toward the cam 31 by means of the spring 82. The arm 80 is provided with a bolt 80—A which is slidable in the slot 42. The shape of the cams 31 and 32 is such that their rotation will first cause the needles 40 to pass through the eyelets 56 and perforate the top layer of the border strip 57 (as shown in Fig. 17) after which the punches 37 are caused to descend and force the eyelets 56 through the top layer of fabric (as shown in Fig. 18). The needles 40 are held at rest while the punches 37 continue to descend and complete the operation (as shown in Fig. 19).

Referring now to the eyelet feeding section of the device, same will be seen to consists of a hopper 83 having an extension 84 on the rear side thereof by means of which it is pivotally attached to a tubular sleeve 85 into which extends the upright pin 86 which is fastened to the hub 87 of the lever 88. The sleeve 85 has a downwardly extending arm 89 which is attached to a spring loaded rod 90 which, in turn, is hingedly connected to a clamp 91 on the bent rod 92 whose lower end is pivotally attached to the arm 93 which is supported by the tubular extension 94 of the hopper 83.

The lever 88 has connected to its lower end a link 95 which, in turn, is connected to the lever 96 on the rock shaft 97 which journals in the housing 22. The inner end of the shaft 97 has secured thereon a hopper shaking cam lever 98. The lever 98 carries a roller 99 which is urged toward the cam 33 by means of a spring 100. The cam 33 is constructed substantially as shown in Fig. 9 for the purpose of providing a series of shaking movements for the hopper 83, and to hold it still during the eyeleting operation by means of the dwell 101.

The hopper 83 is provided with a false bottom 102 which is urged upwardly by the spring 103 which surrounds the guide rod 104. The purpose of the false bottom 102 is to hold the eyelets 56 near the outlet opening 105. Obviously, the more eyelets contained within the hopper 83 the lower will be the floor 102, due to the increased weight, and the tension of the spring 103 should be such that the uppermost level of the eyelets 56 is substantially the same as the bottom of the outlet 105.

Communicating with the outlet 105 and attached to the hopper 83 is a multiple channeled chute 106 whose lowermost end 107 can occupy a position underneath the punches 37. In order to prevent the eyelets 56 from becoming lodged in the channels 108 there is provided above each channel a rattler shoe 109 for each channel 108. The shoes 109 are mounted on the horizontal top portion 110 of the bent rod 92. The upper side 111 of each shoe 109 is curved to permit its inner end 112 to enter the opening 105.

The shoe 109 is provided with a shoulder 113 the purpose of which is to move the eyelets back into the hopper unless their smaller ends have passed downwardly into the channel 108. The shaft 114 is supported by the standard 115 and carries the hub 87.

Across the lower end 107 of the raceway is secured the horizontal bar 116 which rests upon the horizontal holding bar 117 which is pivoted to the head 35 by means of a pin 118. The forward end 119 of the holding bar 117 is curved upwardly and its opposite end 120 is urged downwardly by a compression spring 121 which reacts against the lug 122 on the head 35.

Slidably mounted in the head 35 is a horizontal latch 123 whose downturned end 124 is normally in front of the bar 116. A spring 125, which is mounted on the head 35, urges the latch end 124 toward the bar 116 and moves the bar 116 against the stop 126.

Hinged to the cover plate 43 on the pin 127 is a finger 128 which normally engages the rear side 129 of the bar 116. The finger 128 has on its rear side an inclined face 130 above which is secured a plate 131 to the slide 36. The lower end 132 of the plate 131 engages the race 130 of the finger 128 when the slide 36 moves downwardly causing the lower end of the finger 128 to move the chute end 107 out of the way of the descending punches 37 against the action of the spring 125. The finger 128 is urged away from the bar 116 by the light spring 133.

It will be observed in Fig. 11 that pointed walls 134 occupy the sides between the shoulders 113 and that they extend to the wall 135 which forms a stop for the rattler shoes 109. The outlet of each channel or raceway 108 converges slightly, and one side 136 is supported by a spring 137.

It is desirable to provide the table 20 with a spring stripper plate 138 which facilitates the passing of the fabric over the dies 72, and also insures the removal of the riveted eyelets 56 from the dies at the completion of each operation.

The operation of the machine is as follows: Assuming that there is a supply of eyelets 56 in the hopper 83 and that a piece of border material 57, composed of two ply fabric with an intermediate filler, is fed from the table 58 between the rolls 46 and 59 and that the motor 23 is operating, it will be seen that the rotation of the cam 32 will first move the needle holder 38 downwardly through a waiting eyelet 56. While this is taking place the punch operating cam 31 moves the slide 36 downwardly forcing the eyelets 56 toward the point of the needles 40, which have stopped just above the highest point of the dies 71. The punches 37 continue their movement after the chute end 107 has been moved out of the way by the plate 131, the descending movement of the punches 37 continuing until the eyelet 56 is reformed (as shown in Fig. 19) to constitute a tuft between the two plies of fabric in the border 57.

The cams 31 and 32 then restore the needles 40 and the punches 37 to their uppermost position—that is, clear of the border 57—and the crank disk 67, through its connections 66, 65 and 64 then actuates the feed roll 59 moving the border 57 longitudinally to a new position ready for the insertion of three more eyelets 56.

In order that the channels 108 may be kept filled at all times a shaking motion is imparted to the hopper 83 by the cam 33, and in addition thereto the shoes 109 are given a rattling motion through the rod 92 for the purpose of preventing the eyelets 56 from becoming caught on pieces of lint, or otherwise lodging in the channels 108. If, for any reason, the eyelets should become lodged so that the shoes 109 could not operate, the yielding action of the spring-urged plunger 90 would prevent the destruction of the parts.

If it is desired to vary the longitudinal spacing of the eyelets 56 with relation to the border 57 this is accomplished by shifting the position of the stud 68 with relation to the axis of the shaft 30.

As previously stated, if it is desired to use two rows of eyelets instead of three (as shown) then the needles 40 and the punches 37 are shifted in their respective holders, one set being removed entirely and the machine operated as before. In this event it is necessary to shorten the link 95 by utilizing the extra hole 139 which will shift the position of the chute end 107. Obviously, if no needle enters the eyelets in the unused channel 108 no eyelets will be drawn therefrom.

It is desirable to provide retaining wires 140 over the inclined portion of the channels 108 to prevent the escape of the eyelets 56 therefrom. The wires 140 are supported by the cross wires 141.

I am aware that numerous forms of eyeleting machines have been constructed in the past in which a plurality of eyelets may be passed through several sheets of fabric for the purpose of securing same together. The patent of Coles No. 417,988 is an example of this type of machine. It is therefore not my intention to cover such devices broadly and I have restricted my claims to the specific features of my device which render same more positive in its operation under unfavorable conditions, and requiring less skillful attention in order to maintain the machines in an operative condition.

I claim:

1. An eyelet feed mechanism for a machine of the class described including a hopper having a universal mounting at one side thereof and having a hopper raceway extending from the opposite side thereof in an inclined manner, means for latching the lower end of said raceway at a fixed height, and laterally yieldable means for holding the discharge end of said raceway under the eyelet inserting mechanism and to be moved away from the eyelet inserting position before the eyelet is moved through the material into which it is to be inserted.

2. An eyelet feed mechanism of the class described including a hopper having a universal mounting at one side thereof and having a raceway sloping downwardly from said hopper, means for yieldably latching the lower end of said raceway at a fixed height, yieldable means for holding the discharge end of said raceway under the eyelet inserting mechanism and a cam actuated by said eyelet inserting mechanism for moving said raceway out of the path of the eyelet inserting mechanism.

3. An eyelet feed mechanism for a machine of the class described including a hopper adapted to swing on horizontal and vertical axes, a spring urged bottom in said hopper upon which eyelets may rest, a downwardly sloping raceway secured to said hopper and having its lower end normally disposed beneath the eyelet inserting needles of the machine, yieldable means for latching said lower end in position, a rattler shoe disposed at the upper end of the raceway and slidable longitudinally therewith and means for reciprocating said shoe whereby congestion about the entrance of the raceway may be broken up.

4. In a device of the class described the combination of a rockable hopper having a spring urged bottom and an inclined raceway communicating therewith, the end of said raceway near said hopper being uppermost, eyelet inserting means associated with said raceway, cam means for moving said raceway out of its normal relationship with said eyelet inserting mechanism during the inserting operating and means for agitating the eyelets at their point of entrance to said raceway.

5. In a device of the class described the combination of a hopper and a mounting which will permit the agitation thereof, means for intermittently shaking said hopper, an inclined raceway communicating with said hopper having a rattler shoe for preventing the congestion of eyelets at the entrance of said raceway and an eyelet inserting mechanism at the lower end of said raceway adapted to insert eyelets into a web between the periods of hopper agitation.

WILLIAM S. WATT.